June 7, 1927.
T. E. CARRIGAN
1,631,620
KNOCKDOWN BED FRAME FOR AUTOMOBILES
Filed Nov. 13, 1922
3 Sheets-Sheet 1
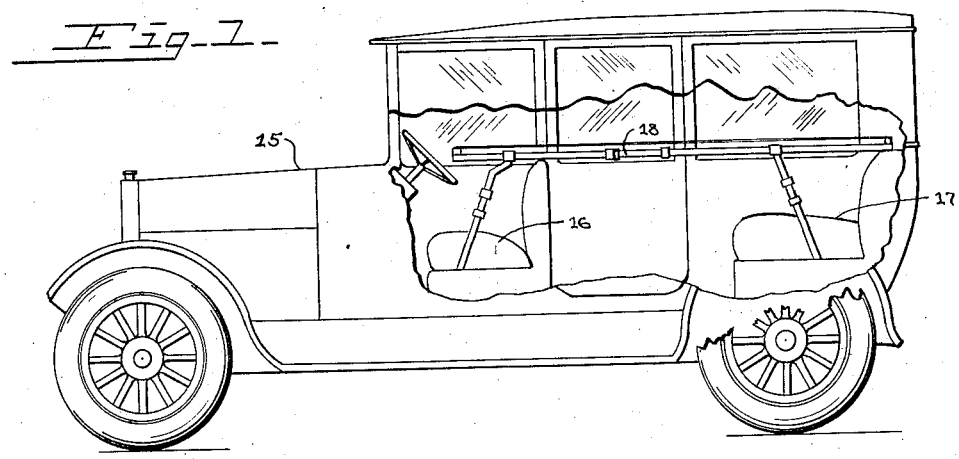
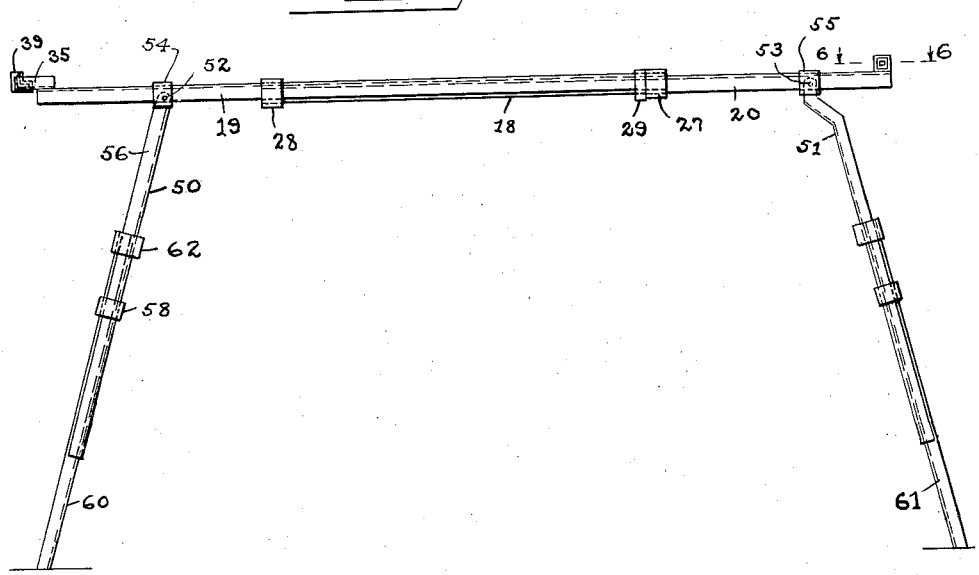
INVENTOR.
Thomas E. Carrigan.
BY
Morsell & Keeney.
ATTORNEYS.

June 7, 1927.
T. E. CARRIGAN
1,631,620
KNOCKDOWN BED FRAME FOR AUTOMOBILES
Filed Nov. 13, 1922
3 Sheets-Sheet 2
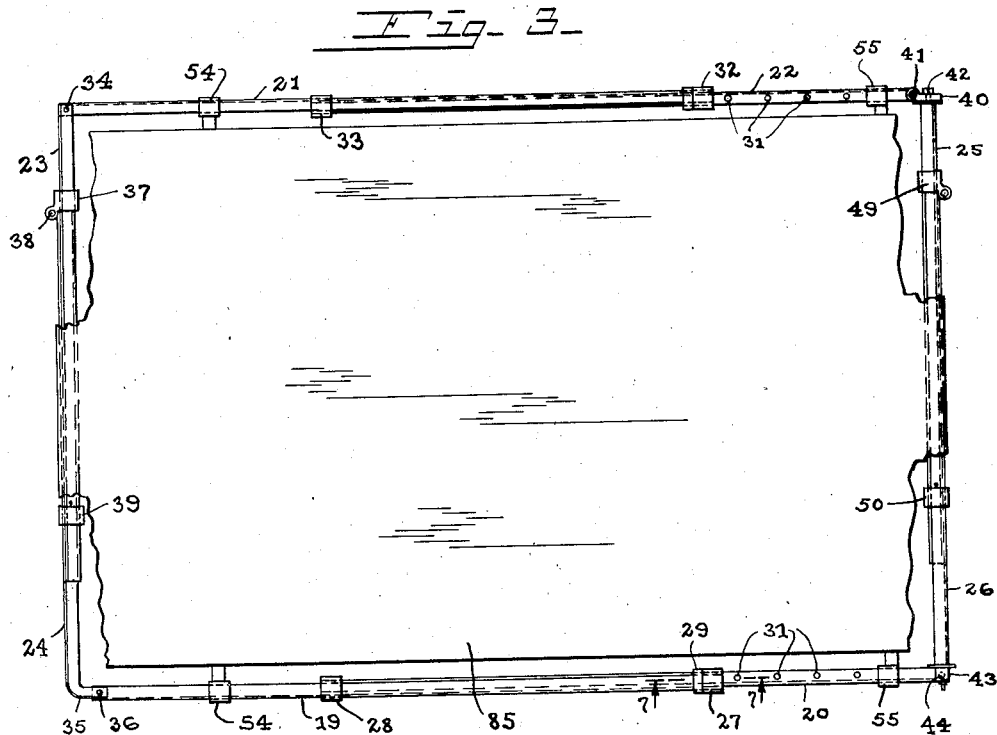
INVENTOR.
Thomas E. Carrigan,
BY Morsell + Keeney
ATTORNEYS.

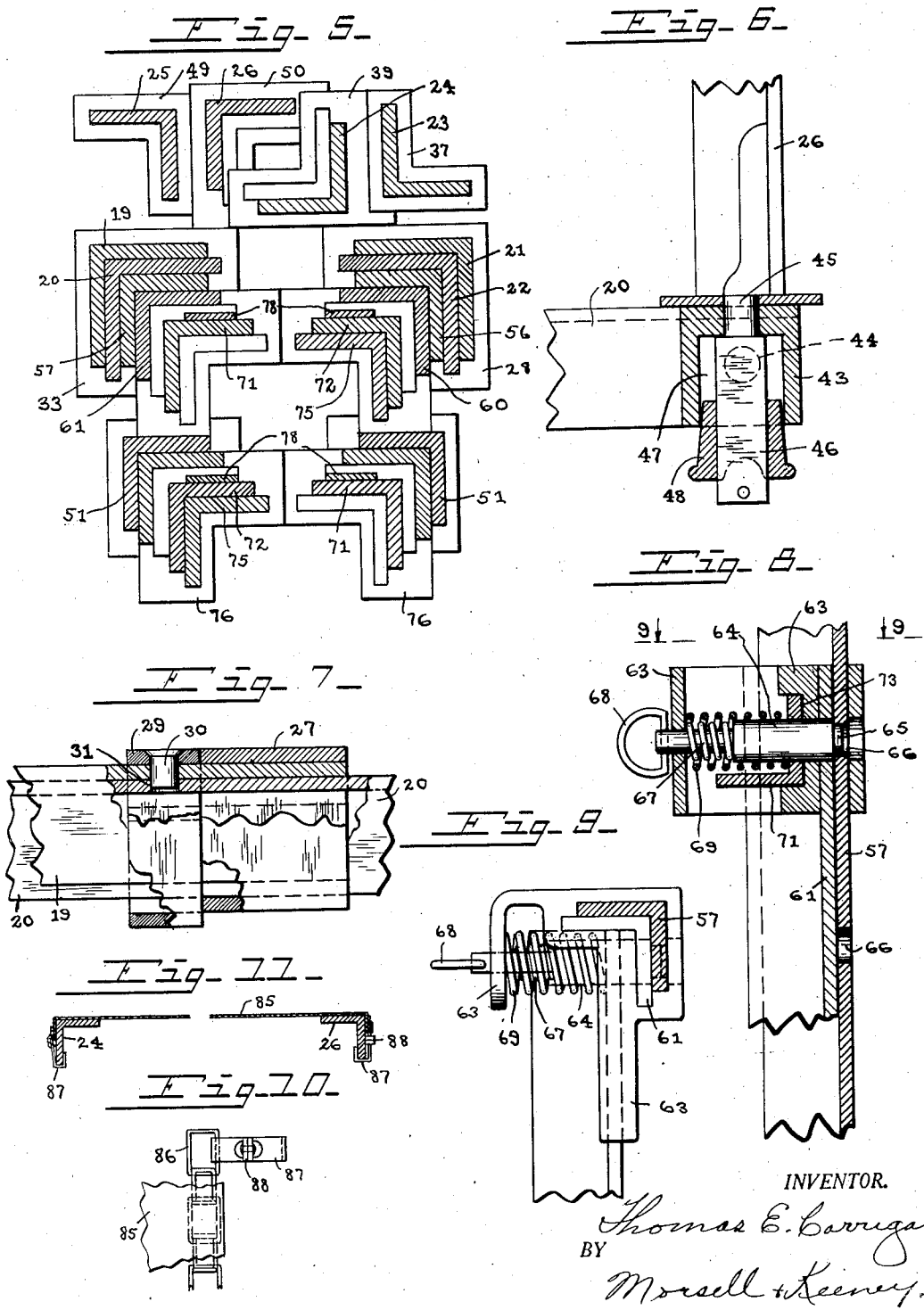

Patented June 7, 1927.

1,631,620

UNITED STATES PATENT OFFICE.

THOMAS E. CARRIGAN, OF MILWAUKEE, WISCONSIN.

KNOCKDOWN BED FRAME FOR AUTOMOBILES.

Application filed November 13, 1922. Serial No. 600,658.

This invention relates to foldable beds or couches, and has for one of its objects to provide a bed frame or couch which is especially adapted for use within the bodies of pleasure automobiles and the like.

A further object of the invention is to provide a bed frame of the class described which may be readily and quickly set up in position within the automobile body and as easily knocked down and folded up to occupy a minimum amount of space in the daytime.

A still further object of the invention is to provide a frame of the class described which is adjustable to suit automobile bodies of different widths, and also adjustable as to length, to accommodate itself to bodies wherein the distance between the front and rear seats varies.

A still further object of the invention is to provide a device of the class described having efficient and readily operable means for tensioning a canvas or other supporting member, which is stretched upon the frame.

A still further object of the invention is to provide a device of the class described which is simple in construction, comparatively inexpensive to manufacture and more efficient in use than those which have been heretofore proposed.

With the above and other objects in view which will appear as the description proceeds, the invention consists in the novel details of construction and combinations of parts more fully hereinafter disclosed and particularly pointed out in the appended claims.

In the accompanying drawings in which like numerals designate like parts in all the views:

Figure 1 is a diagrammatic side elevational view, partly broken away, of an automobile of the closed type, illustrating a bed or couch frame made in accordance with the present invention, in operative position therein;

Fig. 2 is an enlarged side elevational view of the frame illustrated in Fig. 1;

Fig. 3 is a plan view of the parts shown in Fig. 2, portions of the supporting canvas member being broken away to more clearly illustrate the construction of the frame;

Fig. 4 is an end elevational view of the parts shown in Fig. 2, as seen from the left of the said figure;

Fig. 5 is a transverse vertical sectional view, through the frame members when in their folded positions;

Fig. 6 is a fragmentary horizontal sectional view, taken approximately on the plane indicated by the line 6—6 of Fig 2, illustrating the means for locking the tensioning member in position;

Fig. 7 is a fragmentary vertical sectional view through one of the locking sleeves or collars employed for permitting the adjustment of the frame members, the said view being taken approximately on the plane indicated by the line 7—7 of Fig. 3;

Fig. 8 is a fragmentary vertical detail sectional view, taken approximately on the plane indicated by the line 8—8 of Fig. 4, illustrating the sliding connection and locking means for the adjustable supporting legs of the frame;

Fig. 9 is a horizontal sectional view, taken approximately on the plane indicated by the line 9—9 of Fig. 8, looking down;

Fig. 10 is a fragmentary plan view of one end of the canvas supporting member illustrating the means for removably connecting the same to the supporting frame;

Fig. 11 is a vertical longitudinal sectional view, partly broken away, through the end frame members, the supporting canvas being shown in place thereon;

Fig. 12 is an enlarged vertical sectional view taken approximately on the plane indicated by the line 12—12 of Fig. 4, showing one of the locking collars employed for readily releasably securing the transverse bracing member in adjusted position; and, Fig. 13 is a fragmentary detail elevational view, illustrating a form of socket member adapted to be secured to the automobile side frames for receiving the lower ends of the supporting legs of the bed frame.

Referring to the said drawings, the numeral 15 designates a pleasure automobile of any suitable type, here shown as provided with a closed body, known as a sedan, which automobile is provided with the usual front seat 16 and the usual rear seat 17. The collapsible bed frame constituting the present invention is adapted to be positioned within the body of the said vehicle, substantially as illustrated in Fig. 1, with its supporting legs extending downwardly at the ends of the respective seats to the frames of the latter, as will be readily apparent from Fig. 1, and with its main frame portion in a substantially horizontal position, at approximately the height of the backs of the said vehicle seats.

As is best shown in Figs. 2, 3, and 4 the collapsible bed frame comprises a pair of adjustably connected side members, 19 and 20, a second pair of adjustably connected side members, 21 and 22, a pair of adjustably connected front end members, 23 and 24, and a pair of adjustably connected rear end members, 25 and 26. The various members are preferably formed of angle iron and the members 19 and 20 are of such lengths as to overlap one another, their overlapping ends being provided respectively with the rigidly secured collar members, 27 and 28, through each of which the companion member is adapted to slide.

The collar member 28 carried by the frame member 20 is plain, while the collar member 27 carried by the member 19 has associated with it a vertically movable strap 29, carrying a pin 30, adapted to engage in any one of a series of holes or perforations, 31, provided in the horizontally disposed flange of angle iron frame member 20, all as will be clear from Figs. 3 and 7. The pin carrying strap 29 adjacent the collar 27 is of such dimensions as to permit of its movement relative to the other members in a substantially vertical plane, to a sufficient extent to disengage the lower end of the pin 30 from the perforation 31, which it happens to be occupying, to the end that relative movement of the frame members, 19 and 20, may be permitted to adjust the length of the frame.

The frame members 21 and 22, disposed upon the opposite side of the frame, are provided with similar collars, 32 and 33, similar in every respect to the collars 27 and 28, just described, and a further description of them is therefore unnecessary.

The pairs of end frame members are likewise constructed of overlapping angle iron members which are adjustably secured together to permit of the widening of the bed frame. The end member 23 is pivotally secured to the member 21 as at 34 while the member 24 is provided with an angularly disposed end portion 35, which is pivotally secured as at 36 to the side frame member 19, see Fig. 3. The other end of the said member 24 carries a collar 37 hingedly secured thereto, as at 38, through which the member 23 is adapted to slide, and a sliding frictional collar 39 is provided upon the said members 23 and 24 for frictionally engaging the free end of the member 23 to thereby securely lock the two members in their adjusted position.

The opposite end of the frame comprising the members 25 and 26 is secured to the side frame members, 20 and 22, in a somewhat different manner inasmuch as this end of the frame is adapted to be rotated around a horizontal axis for the purpose of tensioning the canvas or other supporting member, which is secured to the frame, all as will appear more fully below.

The connections between the members 22 and 25 comprise a hinge member 40, pivotally secured as at 41 to the member 22 and to which the said member 25 is horizontally pivotally connected as by the stud or bolt 42, see Fig. 3. In like manner, the member 26 is secured to the member 20, through the medium of a hinge or pivot member 43, pivotally secured as at 44 to the said member 20, see Figs. 3 and 6, and the said member 26 is in turn horizontally pivotally secured to the said member 43, as by the pivot bolt 45, which is secured to one flange of the member 26 and is provided with the squared extension 46, best shown in Fig. 6.

The pivot member 43 is provided with an enlarged squared recess 47, into which is adapted to fit a tapered plug 48, which is slidably mounted upon the squared extension 46 of the pivot pin 45. The parts just described constitute a simple and efficient means for locking the end members 25 and 26 against rotation relative to the side frames to the end that the canvas member may be stretched taut and then held in this position.

The members, 25 and 26, overlap in the same manner as the members 23 and 24, and are provided with connecting collars, 49 and 50, similar in every respect to the collars 37 and 39, described in connection with the members 23 and 24.

The parts thus far described are so constructed and assembled as to be capable of assuming a substantially rectangular form when in their operative positions illustrated in Fig. 3, and as will be readily understood they may be extended lengthwise, as well as transversely to produce a bed frame of different sizes, according to the dimensions of the vehicle body, within which the frame is to be employed. Furthermore, by sliding the collars, 39 and 50 downwardly as seen in Fig. 3, until they entirely disengage the ends of the members 23 and 25 respectively, the frame members may be moved around their respective pivots 34, 36, 41 and 44 to occupy folded or knocked down positions whereby they may be caused to take up very little room in the daytime.

In order to support the frame within the vehicle body there is provided two pairs of vertically adjustable leg members, 50 and 51, which are pivotally connected as at 52 and 53 to yokes or collars 54 and 55 respectively slidably secured to the side frame members 19, 20, 21 and 22, as will be clear from Figs. 2 and 3. The said leg members are similar in substantially every detail, and one pair, therefore, will only be described.

Referring more particularly to Figs. 2, 4, 8 and 9 and considering the leg member 50, it will be seen that it comprises a pair of angle members, 56 and 57, pivotally secured to the yokes 54, and slidably engaging the collars or yoke members 58, 59, 62 and 63, respectively. Adjustable bottom angle members, 60 and 61, are rigidly connected to the said yokes, 58 and 59, and carry at or near their upper ends strap or collar members 62 and 63, which members are provided with spring pressed pins or plungers, 64, having a reduced end portion 65, adapted to enter a series of holes or perforations 66, provided in the flanges of the angle members, 56 and 57. These spring pressed connections are illustrated in detail in Figs. 8 and 9 and by referring thereto it will be seen that the said plungers 64 are normally urged into the said holes or apertures 66 by means of a coiled spring 67. The protruding ends of the said plungers are further provided with ring members 68, by means of which they may be easily withdrawn from the said holes to permit the adjustment of the leg members. An additional coiled spring 69 is interposed between the strap member 63 and the brace members 71 to normally hold the parts in intimate relation, whereby rattling and lost motion may be prevented.

The companion leg members are braced transversely by means of an adjustable brace 70, which comprises a pair of angle members, 71 and 72, pivotally secured to the leg members by means of the spring plungers, 64, above described. The strap members 63 are provided with recesses 73 into which the ends of the members, 71 and 72, may enter, as shown in Figs. 8 and 9, and from which they may be disengaged by lateral movement against the pressure of the spring 69, whereby when disengaged they may pivot about the pins 64 and when in engagement with the said recesses they are securely locked against pivotal movement.

The said members, 71 and 72, as shown in Fig. 4, are of such length that their inner ends substantially meet or abut. A bridge member 75 is provided carrying a plurality of slidable collars, 76, adapted to frictionally engage the various members, 71, 72 and 75, to hold the brace member 70 in its adjusted position. The said collars 76 are provided with offset apertures 77, into which the ends of the members, 71 and 72, may be introduced should it become necessary to overlap the ends of the latter members when employing the device in a relatively narrow automobile.

Angularly disposed brace members, 78, are provided, pivotally secured to the leg members, 60 and 61 as at 79 and are likewise pivotally secured to the horizontal bracing members, 71 and 72, as at 80. These said bracing members 78 are hinged adjacent their middle portions, as indicated at 81, whereby they may be folded against the respective members to which they are pivoted when the frame is knocked down.

As above mentioned, and as shown in Fig. 13, socket members, 82, may be secured at suitable points within the body of the automobile, preferably upon the side frames, which socket members are adapted to receive the lowermost ends of the supporting legs, 50 and 51.

In order to secure the canvas or other fabric supporting member 85 to the frame when it is set up, the said member 85 is provided at its opposite ends with flexible chains 86, see especially Fig. 10, to which are secured at suitable intervals angularly disposed hook members 87, which are adapted to engage the vertical flanges of the angle iron end members, 23, 24, 25, and 26, as clearly shown in Fig. 11.

In order that the said member may be securely fastened, even when it is folded back upon itself or pleated to accommodate the frame when in its narrower positions, the said hook members 87 upon one end, are provided with swivel connections 88, so that the said hooks may be readily turned in all directions.

The mode of employing the invention will be obvious from the foregoing, and it is not deemed necessary to describe it in detail. It will also be apparent that the invention provides a foldable frame which is especially adapted for use within automobile bodies, which frame may be readily and quickly set up or knocked down, and which, when in its open and operative position provides a comfortable bed within an automobile body. On the other hand in its closed or knocked down position it occupies little space, thereby adapting it for touring purposes.

While one form of the invention has been illustrated and described it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. A knock-down bed frame for automobiles comprising a pair of spaced longitudinally adjustable side members; a transversely adjustable end member vertically pivoted to one end of each of said side members; members vertically pivoted to the other end of each of said side members, one of which is provided with a recess; a second transversely adjustable end member pivotally carried by said vertically pivoted members for rotation about a horizontal axis;

and slidable means carried by said second end member, adapted to enter said recess and to prevent rotation of said end member.

2. A knock-down bed frame for automobiles comprising a pair of spaced longitudinally adjustable side members; a transversely adjustable and foldable end member vertically pivoted to one end of each of said side members; members vertically pivoted to the other end of each of said side members, one of which is provided with a non-circular recess; a second transversely adjustable and foldable end member pivotally carried by said vertically pivoted members for rotation about a horizontal axis; and a slidable member non-rotatably carried by said second end member, adapted to enter said recess and to prevent rotation of said end member.

3. In a frame construction for knock-down beds for automobiles, a pair of longitudinally adjustable members having overlapping portions, one of said members being provided with a series of spaced holes; a collar rigid with one of said members, through which the other member may slide; a collar provided with a recess, rigid with said member, through which said first member may slide; a spring controlled pin carried by said last named collar, adapted to engage and disengage said holes; a brace member pivotally mounted on said pin, adapted to engage and disengage said recess; and means normally holding said brace member in said recess.

4. A knock-down bed frame for automobiles comprising a pair of spaced longitudinally adjustable side members, supporting legs pivotally and slidably connected to said longitudinally adjustable members; a transversely adjustable end member vertically pivoted to one end of each of said side members; members vertically pivoted to the other end of each of said side members, one of which is provided with a non-circular recess; a second transversely adjustable end member pivotally carried by said vertically pivoted members for rotation about a horizontal axis; and non-cylindrical slidable means carried by said second end member, adapted to enter said recess and to prevent rotation of said end member.

5. A knock-down bed frame for automobiles comprising a pair of spaced longitudinally adjustable side members, supporting legs pivotally and slidably connected to said longitudinally adjustable member; a transversely adjustable and foldable end member vertically pivoted to one end of each of said side members; members vertically pivoted to the other end of each of said side members, one of which is provided with a non-circular recess; a second transversely adjustable and foldable end member pivotally carried by said vertically pivoted members for rotation about a horizontal axis; and a slidable member non-rotatably carried by said second end member, adapted to enter said recess and to prevent rotation of said end member.

In testimony whereof, I affix my signature.

THOMAS E. CARRIGAN.